US011454814B2

(12) United States Patent
Rittger et al.

(10) Patent No.: US 11,454,814 B2
(45) Date of Patent: Sep. 27, 2022

(54) VEHICLE WITH A DISPLAY DEVICE

(71) Applicant: AUDI AG, Ingolstadt (DE)

(72) Inventors: Lena Rittger, Ingolstadt (DE); Joris Mertens, Ingolstadt (DE); Sung Jun Park, Seoul (KR); Seung Mo Kang, Seoul (KR); Jiwon Oh, Seoul (KR)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/416,116

(22) PCT Filed: Dec. 10, 2019

(86) PCT No.: PCT/EP2019/084378
§ 371 (c)(1),
(2) Date: Jun. 18, 2021

(87) PCT Pub. No.: WO2020/126656
PCT Pub. Date: Jun. 25, 2020

(65) Prior Publication Data
US 2022/0075191 A1 Mar. 10, 2022

(30) Foreign Application Priority Data
Dec. 19, 2018 (EP) ..................................... 18213980

(51) Int. Cl.
*G02B 27/01* (2006.01)
*G09G 3/00* (2006.01)
(Continued)

(52) U.S. Cl.
CPC .......... *G02B 27/0149* (2013.01); *B60K 35/00* (2013.01); *B60R 11/0235* (2013.01);
(Continued)

(58) Field of Classification Search
CPC ............ G02B 27/0149; G02B 27/0101; G02B 27/0179; G02B 2027/0118;
(Continued)

(56) References Cited

U.S. PATENT DOCUMENTS 6,227,601 B1 * 5/2001 La .......................... B60J 1/2011
296/97.4
2010/0060028 A1 * 3/2010 Patel ...................... B60J 3/0208
296/97.1
(Continued)

FOREIGN PATENT DOCUMENTS

DE          102 26 451 C1      7/2003
DE     20 2005 014 791 U1     1/2006
(Continued)

OTHER PUBLICATIONS

Extended European Search Report dated Jun. 6, 2019 for European Application No. 18213980.8.
(Continued)

*Primary Examiner* — Christopher E Leiby
(74) *Attorney, Agent, or Firm* — Staas & Halsey LLP

(57) ABSTRACT

A display panel with a pixel matrix has control circuitry designed to actuate at least one pixel element of the pixel matrix for displaying at least one graphic display object. The display panel is flexible and is movably supported by a controllable supporting arrangement. An electronic control unit can adjust a position of the display panel as a function of a position signal between a first position, where the display panel can cover at least one portion of a vehicle roof, and a second position, where the display panel can cover at least one portion of a windscreen.

18 Claims, 2 Drawing Sheets

(51) Int. Cl.
  *B60K 35/00* (2006.01)
  *B60R 11/02* (2006.01)
  *G06F 3/01* (2006.01)
  *B60R 11/00* (2006.01)

(52) U.S. Cl.
  CPC ..... *G02B 27/0101* (2013.01); *G02B 27/0179* (2013.01); *G06F 3/013* (2013.01); *G09G 3/007* (2013.01); *G09G 3/035* (2020.08); *B60K 2370/143* (2019.05); *B60K 2370/146* (2019.05); *B60K 2370/1523* (2019.05); *B60K 2370/1529* (2019.05); *B60K 2370/1533* (2019.05); *B60K 2370/175* (2019.05); *B60K 2370/21* (2019.05); *B60K 2370/52* (2019.05); *B60K 2370/67* (2019.05); *B60K 2370/771* (2019.05); *B60R 2011/008* (2013.01); *B60R 2011/0028* (2013.01); *G02B 2027/0118* (2013.01); *G02B 2027/0138* (2013.01); *G02B 2027/0159* (2013.01); *G02B 2027/0187* (2013.01); *G09G 2354/00* (2013.01); *G09G 2360/144* (2013.01); *G09G 2380/10* (2013.01)

(58) Field of Classification Search
  CPC .... G02B 2027/0138; G02B 2027/0159; G02B 2027/0187; G09G 3/035; G09G 3/007; G09G 2354/00; G09G 2360/144; G09G 2380/10; B60K 35/00; B60K 2370/1529; B60K 2370/771; B60K 2370/143; B60K 2370/175; B60K 2370/67; B60K 2370/1533; B60K 2370/1523; B60K 2370/52; B60K 2370/146; B60K 2370/21; B60R 11/0235; B60R 2011/0028; B60R 2011/008; G06F 3/013
  See application file for complete search history.

(56) References Cited

U.S. PATENT DOCUMENTS

| | | | |
|---|---|---|---|
| 2012/0140126 A1* | 6/2012 | Werth | B60R 11/0264 |
| | | | 296/210 |
| 2014/0168608 A1* | 6/2014 | Disley | G03B 29/00 |
| | | | 352/132 |
| 2017/0232908 A1 | 8/2017 | Jung | |
| 2017/0313248 A1* | 11/2017 | Kothari | B60R 1/00 |
| 2017/0349098 A1* | 12/2017 | Uhm | G08G 1/0967 |
| 2018/0012562 A1* | 1/2018 | Mertens | G09G 5/10 |
| 2018/0050636 A1 | 2/2018 | Espig | |
| 2019/0092170 A1* | 3/2019 | Gassman | B60J 3/0204 |
| 2019/0232786 A1* | 8/2019 | Sasaki | B60K 37/06 |
| 2019/0258873 A1* | 8/2019 | Kishimoto | B60R 11/0235 |
| 2019/0263328 A1* | 8/2019 | Jung | B60K 37/04 |
| 2019/0315275 A1* | 10/2019 | Kim | B60R 1/00 |
| 2019/0385574 A1* | 12/2019 | Helot | G06F 1/1641 |
| 2020/0189484 A1* | 6/2020 | Choi | B60R 11/00 |
| 2021/0022259 A1* | 1/2021 | Song | H05K 5/0217 |
| 2021/0162931 A1* | 6/2021 | Bruegl | F16M 11/2028 |
| 2021/0197731 A1* | 7/2021 | Vervoort | B60R 11/0235 |

FOREIGN PATENT DOCUMENTS

| | | |
|---|---|---|
| DE | 10 2017 212 518 B3 | 6/2018 |
| EP | 1 637 387 A1 | 3/2006 |
| JP | 2006-168569 A | 6/2006 |

OTHER PUBLICATIONS

International Search Report dated Feb. 21, 2020 for International Application No. PCT/EP2019/084378.
Translation by WIPO of International Preliminary Report on Patentability for PCT/EP2019/084378, dated Jun. 16, 2021, 7 pp.
PCT/EP2019/084378, filed Dec. 10, 2019, Lena Rittger, Audi AG.
18213980.8, filed Dec. 19, 2018, Lena Rittger, Audi AG.

* cited by examiner

VEHICLE WITH A DISPLAY DEVICE

CROSS REFERENCE TO RELATED APPLICATIONS

This application is a U.S. national stage of International Application No. PCT/EP019/084378, filed on Dec. 10, 2019. The International Application claims the priority benefit of European Application No. 18213980.8 filed on Dec. 19, 2018. Both the International Application and the European Application are incorporated by reference herein in their entirety.

BACKGROUND

Described below is a vehicle with a display device. The display device has a display panel which is designed to display at least one graphic display object, wherein the display panel is at a position covering a vehicle roof.

Nowadays display devices have become an integral part of a vehicle. The display device usually has a display panel (with or without touch screen functionality) which usually functions as a graphical user interface. The display panel can be integrated in a dashboard of the vehicle, so that when required, a user, can use the display panel to communicate with the other devices of the vehicle. Furthermore, display panels can be also used as a digital display vehicle roof, such that different visualization effects and/or animations can be depicted on vehicle roof of the vehicle. The display panels can also be integrated in to the vehicle roof by a foldable arrangement, such that when desired the display panel can be displayed, so that a user can view different functionalities offered by the display panel. However, for the use of a display panel as a graphical user interface on the dashboard or as a display panel on the vehicle roof, at least two different display panels are required to be integrated in the vehicle, which is expensive.

Document US 2018/0050636 A1 discloses a virtual panoramic roof or sun-roof for a motor vehicle, the roof being capable of realistically reproducing or adapting the outside world. An assembly comprises at least one sensor device, in particular an image capture device for recording the surroundings of the motor vehicle, and at least one reproduction device, disposed on an inner face of the roof, for reproducing a virtual representation of the surroundings captured by the sensor device. However, the display panel is not movable and cannot be used as graphical user interface in front of the dashboard of the vehicle.

Document DE 102 26 451 C1 discloses a vehicle roof whose underside facing the interior has a screen for a projection unit for information to be displayed. However, the display panel cannot be used as a graphical user interface in front of the dashboard of the vehicle.

Document DE 20 2005 014 791 U1 discloses a device which has a laminar organic light emitting diode (OLED) display constructed for a light source, which is designed for emitting light into an internal space. The OLED display has a layer with a set of OLED cells, which are arranged in an OLED cell array. The OLED display has another layer, which is contact sensitive and has a set of sensor cells. The OLED display has a display panel, over which information is displayed. However, the display panel is not movable and cannot be used both as a graphical user interface in front of the dashboard of the vehicle and as a digital display vehicle roof.

SUMMARY

Described herein is a vehicle with a display device which is movably adjusted between a position corresponding to a vehicle roof and to a position in front of a windscreen, so that the display panel functions as a graphical user interface as well as a digital display vehicle roof.

The display device has a display panel with a pixel matrix. Furthermore, the display device has control circuitry, wherein the control circuitry is designed to actuate at least one pixel element of the pixel matrix for displaying at least one graphic display object. In a respective non-actuated state, each pixel element may be transparent. In other words, the display panel may be transparent. Alternatively the display panel may be light-blocking. The display panel, for example, is designed as a possibly transparent screen with organic light emitting diodes (OLED) as pixel elements. The organic light emitting diodes can be distributed over a total area of the screen. The control circuitry controls an actuation of the organic light emitting diodes as per a required location or position of the at least one graphic display object on the display panel with respect to an optimal viewability of a user. The user can be the driver of the vehicle. Furthermore, the display panel can be designed as another screen with transparent organic light emitting diodes (TOLED), which can further include an additional layer of a so called polymer dispersed liquid crystal (PDLC) or a thin-film transistor screen (TFT) or a dynamic scattered liquid crystal (DSLC) or a suspended particle device (SPD) or a monochrome transparent segmented liquid crystal device. If at a point of time, the at least one graphic display object is needed to be displayed on a particular location on the display panel, then the control circuitry activates a plurality of pixel elements at that particular location, which in turn enables the plurality of pixel elements of that particular location on the display panel to radiate a monochromatic light or a light of various colors corresponding to the at least one graphic display object. The output of the at least one graphic display object may be requested by a first control signal that may be received by the control circuitry. However, the other pixel elements correspond to a non-activated state and hence, remain transparent. This enables the rest of the display panel, which is not occupied by the at least one graphic display object to remain transparent.

Furthermore, the display panel is flexible. In other words, the display panel can be the OLED screen including a transparent deformable substrate, which can enable the display panel to deform up to a predefined radius of curvature. The radius can be in the range of 5 centimeters to 50 centimeters. This can enable a usage of the display panel for instances where a deformation of the display panel is required for predefined interval of time and/or for applications of the display panel as a curved or wavy formed display panel.

The display panel in a first position is designed to cover at least one portion of a vehicle roof or the whole vehicle roof and is movably supported by a controllable supporting arrangement. In other words, in the first position, the display panel can be used to provide visualization effects and/or animations to the vehicle roof which can lead to ergonomic benefits. Hence, the display panel can function as a digital display vehicle roof. Furthermore, the vehicle has an electronic control unit which is designed to adjust a position of the display panel between the first position and a second position as a function of a position signal derived from a source and/or in accordance with a driving situation. In other words, the position of the display panel can be adjusted to any position between the first position and the second position. An adjustment of the position of the display panel can be enabled by controlling the controllable supporting arrangement. The controllable supporting arrangement can include a plurality of actuators, for example electric motor or servo motor. The source can be a gesture from the user inside the vehicle, furthermore, the driving situation can be one of a manual driving and an autonomous driving. In other words, the position of the display panel can be adjusted by a gesture from the user inside the vehicle. Furthermore, the a rate of change of position of the display panel and the direction of an adjustment of the position the display panel corresponds to the position signal as derived from the source. In other words, at least one of the sensor of the vehicle can send a sensor signal which may provide information about the environment or position of the user inside the vehicle to the electronic control unit. Based on the sensor signal, the electronic control unit can derive the position signal and send an actuation signal along with the position signal to a plurality of actuators of the controllable supporting arrangement. The actuators of the controllable supporting arrangement may in turn be activated by the received actuation signal and adjust the position of the display panel to an intermediate position between the first position and the second position in accordance with the received position signal. For example, the controllable supporting arrangement can be in form of two rails running sideways along the longitudinal direction of the vehicle from the vehicle roof along the side of an A-pillar and along a windscreen up to a dashboard of the vehicle, such that the display panel can be moved and adjusted to the intermediate position between the first position and the second position, as per a requirement of a user.

In the second position, the display panel is designed to cover at least one portion of the windscreen, either complete or at least 70 percent of the windscreen. This is of advantage, because in the second position, the display panel can function as a graphical user interface and due to its position in front of the windscreen, it can be reachable to the user, who can be the driver of the vehicle to reach the display panel, for example by his fingers and access the display panel.

In one embodiment, the control circuitry can be adapted to display a representation of a roof module as the graphic display object on the display panel at a constant position relative to a reference point inside the vehicle. In other words, when the display panel located in the first position, that is the display panel covers the at least one portion of the vehicle roof, the user can be able to view the roof module of the vehicle. However, when the display panel is adjusted to a position between the first position and the second position, the display panel can cover the roof module of the vehicle. Hence, in order to enable the user to use the roof module of the vehicle, the representation of the roof module as the graphic display object or the digital display vehicle roof module is displayed on the display panel, at a point of time when the display panel covers at least one portion of the roof module. The digital display vehicle roof module can have functionalities of the roof module, such as an interface for communication between the user and other vehicle subsystems and/or functionality of a rear view mirror and/or processing sensor signals for windscreen sensors and/or controlling the entire lightening of vehicle interior. The user can access the roof module by providing user input signals by voice and/or gesture and/or touch signals. The user can access the digital display vehicle roof module in a similar manner as the roof module, furthermore, the digital display vehicle roof module can be positioned at the similar location of the roof module before it was covered by the display panel. This can be enabled by a camera, which can send a panel position signal to the electronic control unit. At the point of time, at which the display panel covers at least one portion of the roof module, the electronic control unit can detect the covering of the roof module by the display panel. Upon a detection of a covering of the at least one portion of the roof module by the display panel, the electronic control unit can send a roof module activation signal to the control circuitry. The roof module activation signal can include a data file providing the current settings of the roof module at the time of detection of at least partial covering of the roof module by the display panel.

Upon receiving the roof module activation signal, the control circuitry can actuate the pixel elements of the display panel at a location on the display panel corresponding to positional coordinates of the roof module and in accordance with the data file. Hence, a digital display vehicle roof module can be displayed on the display panel at the same location as the roof module and with the same settings of the roof module before it was covered by the display panel. Hence, the user would be able to further access the functionalities of the roof module as before by the digital display vehicle roof module. Furthermore, when the display panel is in a moving state, the digital display vehicle roof module is displayed on the display panel at the constant position, that is at the position corresponding to the positional coordinates of the roof module, relative to a reference point inside the vehicle, for example a static reference point inside the vehicle. This is realized by shifting an actuation of the pixel elements corresponding to the graphic display object representing the roof module or the digital display vehicle roof module, wherein a magnitude of a rate of shifting the actuation of the pixel elements, which correspond to the digital display vehicle roof module, is equal to a magnitude of a rate of change of position of the display panel. Furthermore, the direction of the rate of shifting of the actuation of the pixel elements, which correspond to the digital display vehicle roof module, is opposite to the direction of the rate of change of position of the display panel. The information of the rate of change of position of the display panel can be obtained by the electronic control unit from the position signal, which in turn sends the position signal along with the roof module activation signal to the control circuitry to actuate the pixel elements corresponding to the digital display vehicle roof module. For example, in a cartesian coordinate system along the rails of the controllable supporting arrangement, such that a direction along the rails from the vehicle roof to the dashboard is the X-axis. In this case, if display panel covers at least one portion of the roof module at a point of time and the rate of change of the position of the display panel is U meters per second along a positive direction of the X-axis, then in this case, the control circuitry would pixel elements, corresponding to the digital display vehicle roof module, and shift the actuation of the pixel elements, corresponding to the digital display vehicle roof module, at a rate of U meters per second along a positive direction of the X-axis. This is of advantage, because the user continue using the digital display vehicle roof module without any inconvenience, since the position of the digital display vehicle roof module remains constant relative to the reference point inside the vehicle.

In one embodiment, the display panel can have an additional layer with a substrate having an adjustable degree of light transmission. The additional layer can have a total surface area of the same size or at least 80% of the size of the pixel matrix of the display panel and can be attached to the pixel matrix mechanically or glued or laminated, which can be chosen by a person with ordinary skill in the related field. The substrate, for example, may correspond to the SPD or PDLC or DSLC technology. Furthermore, the substrate of the second layer can be designed to allow a transmission of electricity or are electrically conductive. In order to achieve an adjustable degree of light transmission, a voltage difference can be enabled across a part or area of the substrate of the additional layer. This can enable achieve different degrees of transparency dynamically by adjusting the voltage. Furthermore, the control circuitry is adapted to adjust a degree of light transmission through the display panel, for example by adjusting the voltage difference, as a function of a transparency signal from a luminosity sensor. This is of advantage, because this enables the display panel to function as a sunshine roof, such that the degree of transmission of sunlight through the display panel can be adjusted as a function of the transparency signal from the luminosity sensor. The luminosity sensor can determine the luminosity of sunlight which may be incident on the vehicle roof at a point of time, and according to the determined luminosity of the sunlight at that point of time, the luminosity sensor can send the transparency signal to the control circuitry. The control circuitry can adjust the degree of the light transmission through the display unit such that the luminosity of the transmitted light lies with a predefined luminosity tolerance. The predefined luminosity tolerance can be adjusted or set by a user input signal through the display panel, such that the luminosity of the transmitted light is comfortable to the eyes of the user.

In one embodiment, the source can include user input by a gesture and/or voice input and/or a touch signal, based on which the position signal is derived by the electronic control unit. In other words, the camera inside the vehicle can identify the gesture by the user as the user input for a degree of adjustment of the position of the display panel, for example, the motion of a hand of the user with his/her finger pointing towards the display panel. On the basis of the user input, the camera can provide a position view signal to the electronic control unit, which in turn estimates the corresponding position signal and adjusts the position of the display panel accordingly. In a similar manner, a microphone can capture a voice input signal as a user input and send a corresponding voice signal to the electronic control unit, which in turn estimates the corresponding position signal and adjusts the position of the display panel accordingly. The user input can further be provided by the touch signal, for example, through the display device itself or a joystick beside a vehicle seat. Based on the touch signal, the electronic control unit can estimate the position signal and adjust the position of the display panel accordingly. This is of advantage, because it enables the user to adjust the display panel at a desired position in a comfortable manner.

In one embodiment, the source can include a light detection sensor which is designed to estimate an angle of incidence of a light beam of a predefined intensity on the vehicle roof, based on which the position signal is derived by the electronic control unit. The light detection sensor can estimate the angle of incidence of the light beam, for example sun light, on the vehicle roof. The light detection sensor can send a beam angle signal to the electronic control unit. The beam angle signal can provide information regarding the estimated angle of incidence of the light beam. Based on the received beam angle signal, the electronic control unit can estimate the position signal and adjust the display panel accordingly, such that a part of the light beam which is incident orthogonally on a region between the vehicle roof and the dashboard is covered by the display panel as the sunshine roof.

In one embodiment, the source can include the camera which is designed to estimate the position of eyes of the user driving the vehicle, based on which the position signal is derived by the electronic control unit. In other words, the camera inside the vehicle can estimate the position of the eyes of the user. On the basis of which, the camera can provide a view signal to the electronic control unit. Based on the received view signal, the electronic control unit can estimate the position signal and adjust the display panel accordingly, such that the display panel is at adjusted to a position in order to provide a comfortable perceivability to the user.

In one embodiment, the display panel can be movable by the controllable supporting arrangement along a longitudinal direction of the vehicle. This is of advantage, because this can enable an adjustment of the position of the display panel between the first position, where it can cover the at least one portion of the vehicle roof and the second position, where it can cover the at least one portion of the windscreen. Furthermore, a movement of the display panel along the longitudinal direction enables the adjustment along the direction of driving of the vehicle, so that the display panel can be at a position between over head of the user and in front of the user. This can enable the user to perceive the display panel.

In one embodiment, the driving situation of the vehicle can be one a manual driving and an autonomous driving. This is of advantage, because it enables the adjustment of the position of the display panel according to the manual driving or the autonomous driving of the vehicle.

In one embodiment, during the autonomous driving, the display panel is adjusted to the second position, wherein the display panel is designed to function as a graphical user interface (GUI). This is of advantage, because during the autonomous driving, the user would not have to concentrate on the driving of the vehicle and hence, the user can be seated in the vehicle and access the display panel as the graphical user interface, for example use an infotainment system with the display panel.

In one embodiment, the display panel can be designed to function as an electronic mirror. In other words, during the autonomous driving, when the display is adjusted to the second position, that is in front of the windscreen, the user can use the display panel as the electronic mirror. This can be enabled by the camera which sends a mirror signal to the control circuitry, which in turn can enable the display of the mirrored image, for example of the user himself being seated in front of the display panel. This is of advantage, because the user can utilize this functionality of the display panel as the electronic mirror, for example to change dress or get ready for an event while being inside the vehicle, during the autonomous driving.

The vehicle may be a motor vehicle, in particular a passenger vehicle or a truck, or a bus.

The features of the different embodiments may also be combined.

BRIEF DESCRIPTION OF THE DRAWINGS

These and other aspects and advantages will become more apparent and more readily appreciated from the following description of an exemplary implementation, taken in conjunction with the accompanying drawings of which.

DETAILED DESCRIPTION

Figure 1:
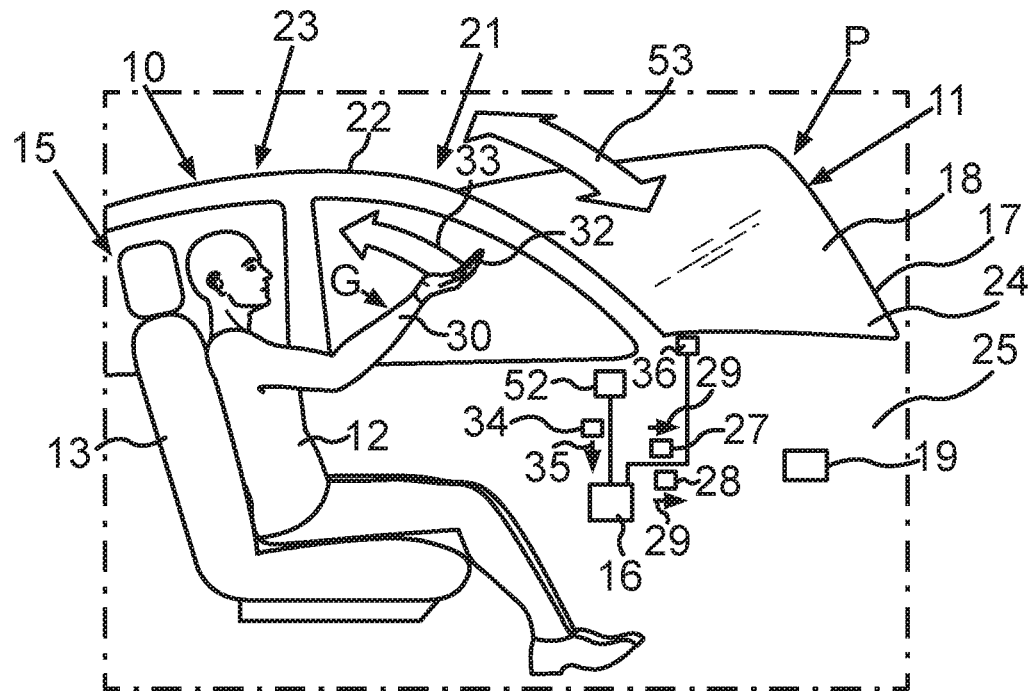
FIG. 1 a schematic side view of an embodiment of a vehicle interior with a display device.

Reference will now be made in detail to the preferred embodiments, examples of which are illustrated in the accompanying drawings, wherein like reference numerals refer to like elements throughout.

The embodiment explained in the following has described components that each represent individual features which are to be considered independently of each other and which each develop the invention independently of each other and thereby are also to be regarded as a component in an individual manner or in another than the shown combination. Furthermore, the described embodiment can also be supplemented by further features already described.

In the figures identical reference signs indicate elements that provide the same function.

Figure 2:
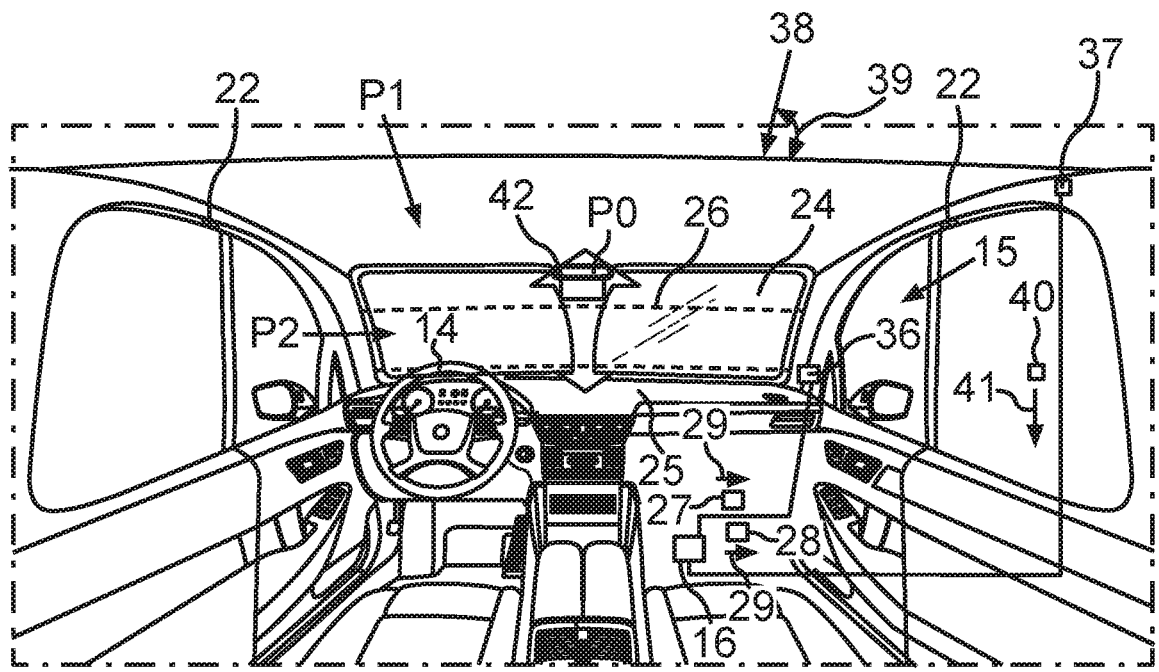
FIG. 2 a schematic perspective view of the interior of the vehicle with the display device.
Figure 3:
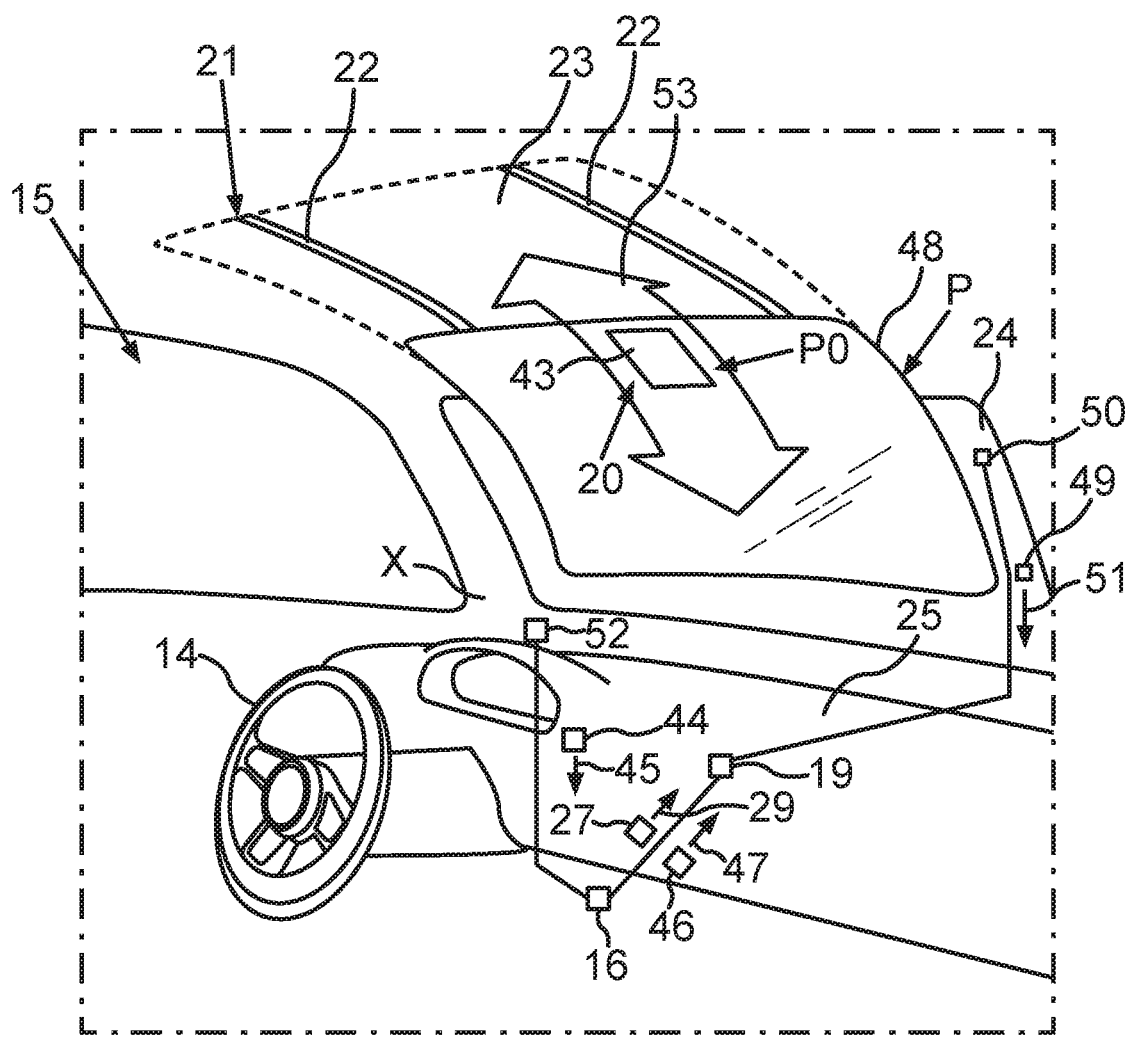
FIG. 3 another schematic perspective view of the interior of an embodiment of the vehicle with the display device.

FIG. 1 shows a schematic illustration of a vehicle 10 with a display device 11. The vehicle 10 can be motor vehicle, such as a passenger vehicle. The vehicle 10 can be driven manually by a user 12, who can be seated on a vehicle seat 13. The user 12 can maneuver the vehicle 10 by a steering wheel 14, as shown in FIG. 2 and FIG. 3. In the figures, an interior region 15 of the vehicle 10 is depicted. Furthermore, the vehicle 10 can be driven autonomously by an electronic control unit 16. The display device 11 has a display panel 17 with a pixel matrix 18. The display panel 17 can be designed as a transparent screen with transparent organic light emitting diodes (TOLED), which can further include an additional layer of a so called polymer dispersed liquid crystal (PDLC) or a thin-film transistor screen (TFT) or a dynamic scattered liquid crystal (DSLC) or a suspended particle device (SPD) or a monochrome transparent segmented liquid crystal device. Furthermore, the display device 11 has control circuitry 19, wherein the control circuitry 19 is designed to actuate at least one pixel element of the pixel matrix 18 for displaying at least one graphic display object 20, wherein in a respective non-actuated state each pixel element can be transparent.

The vehicle 10 has a controllable supporting arrangement 21, wherein the controllable supporting arrangement 21 can include two rails 22. The of two rails 22 can be running sideways along the longitudinal direction of the vehicle 10 starting from a vehicle roof 23 and alongside a windscreen 24 up to a dashboard 25 of the vehicle 10. The display panel 17 in a first position P1 is designed to cover at least one portion of the vehicle roof 23 and is movably supported by the controllable supporting arrangement 21. The electronic control unit 16 is designed to adjust a position of the display panel 17 between the first position P1 and a second position P2 as a function of a position signal 27 derived from a source and/or in accordance with a driving situation D1, D2. In the second position P2, the display panel 17 is designed to cover at least a portion of the windscreen 24, as shown in FIG. 2, wherein the second position P2 is depicted by dashed lines 26. It is thinkable, that the display panel 17 can cover the entire windscreen 24, especially when the driving situation D1, D2 is an autonomous driving D2. In this case, the user 12 would not have to concentrate on the driving of the vehicle 10 and hence, the user 12 can be seated in the vehicle 10 by adjusting the vehicle seat 13 to a comfortable laid back position (not shown in figures) and access the display panel 17 as a graphical user interface, for example, use an infotainment system with the display panel 17. Moreover, the display panel 17 in the second position P2 can be designed to function as an electronic mirror.

When the driving situation D1, D2 is a manual driving D1, wherein the user 12 can adjust the vehicle seat 13 to an upright position and can maneuver the vehicle 10 using the steering wheel 14. In this case, the user 12 can provide a user input by a gesture G and/or a voice input and/or a touch signal, based on which the position signal 27 is derived by the electronic control unit 16 and the display panel 17 can be adjusted to a position, for example the first position P1, so that the user 12 can view outside through the windscreen 24 for driving the vehicle 10.

For example, a camera 52 inside the vehicle 10 can identify the gesture G by the user 12, for example, the motion of his hand 30 with his finger 32 pointing towards the display panel 17, as shown by an arrow 33. On the basis of the user input, the camera 52 can provide a position view signal 34 to the electronic control unit 16, as shown by an arrow 35. The electronic control unit 16 can in turn estimate the corresponding position signal 27 and adjust the position of the display panel 17 accordingly.

Based on the position view signal 34, the electronic control unit 16 can derive the position signal 27 and send an actuation signal 28 along with the position signal 27 to a plurality of actuators 36 of the controllable supporting arrangement 21, as shown by arrows 29. The actuators 36 of the controllable supporting arrangement 21 may be servo motors located between the display panel 17 and the rails 22. The actuators 36 can be activated by the received actuation signal 28 and adjust the position of the display panel 17 to an intermediate position P between the first position P1 and the second position P2 in accordance with the received position signal 27, as shown by an arrow 53. Similarly, the source can include the camera 52 which can be designed to estimate the position of eyes of the user 12, who can be driving the vehicle 10, based on which the position signal 27 can be derived by the electronic control unit 16 and the position of the display panel 17 can be adjusted accordingly.

Furthermore, the source can include a light detection sensor 37, which can be located on an outer side of the vehicle roof 23. The light detection sensor 37 can be designed to estimate an angle of incidence 39 of a light beam 38 of a predefined intensity on the vehicle roof 23, based on which the position signal 27 can be derived by the electronic control unit 16. The light detection sensor 37 can estimate the angle of incidence 39 of the light beam 38, for example sun light, incident on the vehicle roof 23. The light detection sensor 37 can send a beam angle signal 40 to the electronic control unit 16, as shown by an arrow 41. The beam angle signal 40 can provide information regarding the estimated angle of incidence 39 of the light beam 38. Based on the received beam angle signal 40, the electronic control unit 16 can estimate the position signal 27 and send the actuation signal 28 along with the position signal 27 to a plurality of actuators 36 of the controllable supporting arrangement 21, as shown by arrows 29. Hence, the position of the display panel 17 can adjusted accordingly, such that a part of the light beam 38 which is incident orthogonally on a region between the vehicle roof 23 and the dashboard 25 is covered by the display panel 17 as a sunshine roof.

Furthermore, the control circuitry 19 can be adapted to display a representation of a roof module 42 as the graphic display object 20 on the display panel 17 at a constant position P0 relative to a reference point X inside the vehicle 10. In other words, when the display panel 17 located in the first position P1, that is the display panel 17 can cover the at least one portion of the vehicle roof 23, the user 12 can be able to view the roof module 42 of the vehicle 10. However, when the display panel 17 is adjusted to the position P between the first position P1 and the second position P2, the display panel 17 can cover the roof module 42 of the vehicle 10. Hence, in order to enable the user 12 to use the roof module 42, the representation of the roof module 42 as the graphic display object 20, which can be also referred to as a digital display vehicle roof module 43, is displayed on the display panel 17, at a point of time when the display panel 17 covers at least one portion of the roof module 42. The digital display vehicle roof module 43 can be adapted to perform the functionalities of the roof module 42. The user 12 can access the roof module 42 by providing user input signals by voice and/or gesture and/or touch signals. The user 12 can access the digital display vehicle roof module 43 in a similar manner as the roof module 42. Furthermore, the digital display vehicle roof module 43 can be positioned at the similar location P0 of the roof module 42 before it was covered by the display panel 17. This can be enabled by the camera 52, which can send a panel position signal 44 to the electronic control unit 16, as shown by the arrow 45. At the point of time, at which the display panel 17 covers at least one portion of the roof module 42, the electronic control unit 16 can detect the covering of the roof module 42 by the display panel 17. Upon a detection of a covering of the at least one portion of the roof module 42 by the display panel 17, the electronic control unit 16 can send a roof module activation signal 46 to the control circuitry 19, as shown by an arrow 47. The roof module activation signal 46 can include a data file, providing the current settings of the roof module 42 at the time of detection of the covering of the roof module 42 by the display panel 17. Upon receiving the roof module activation signal 46, the control circuitry 19 can actuate the pixel elements of the display panel 17 at a location on the display panel 17 corresponding to positional coordinates of the roof module 42 and in accordance with the data file. Hence, the digital display vehicle roof module 43 can be displayed on the display panel 17 at the same position P0 as the roof module 42 and with the same settings of the roof module 42 before it was covered by the display panel 17.

Furthermore, when the display panel 17 is in a moving state, as depicted by the arrow 53, the digital display vehicle roof module 43 can be displayed on the display panel 17 at the constant position P0, that is at the position P0 corresponding to the positional coordinates of the roof module 42, relative to a reference point X inside the vehicle 10. This is realized by shifting an actuation of the pixel elements corresponding to the graphic display object 20 representing the roof module 42 or the digital display vehicle roof module 43, wherein a magnitude of a rate of shifting the actuation of the pixel elements, which correspond to the digital display vehicle roof module 43, is equal to a magnitude of a rate of change of position of the display panel 17. Furthermore, the direction of the rate of shifting of the actuation of the pixel elements, which correspond to the digital display vehicle roof module 43, is opposite to the direction of the rate of change of position P of the display panel 17. The information of the rate of change of position P of the display panel 17 can be obtained by the electronic control unit 16 from the position signal 27, which in turn can send the position signal 27 along with the roof module activation signal 46 to the control circuitry 19 to actuate the pixel elements corresponding to the digital display vehicle roof module 43.

Furthermore, the display panel 17 can have an additional layer 48 with a substrate having an adjustable degree of light transmission, wherein the control circuitry 19 is adapted to adjust a degree of light transmission through the display panel 17 as a function of a transparency signal 49 from a luminosity sensor 50, as shown by the arrow 51.

Overall, the example shows how the vehicle 10 enables a display panel 17 of a display device 11 to be movably adjusted between a position P corresponding to the vehicle roof 23 and to a position in front of the windscreen 24, so that the display panel 17 can function as a graphical user interface as well as a digital display vehicle roof in an efficient manner.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A vehicle with a display device comprising:
   at least one vehicle sub-system;
   a roof having a roof module configured to control the at least one vehicle sub-system;
   a windscreen;
   a display panel with a pixel matrix, the display panel being flexible;
   control circuitry configured to actuate at least one pixel element of the pixel matrix for displaying at least one graphic display object, including a representation of the roof module aligned with the roof module when any portion of the display panel covers a corresponding portion of the roof module;
   a controllable supporting arrangement movably supporting the display panel; and
   an electronic control unit configured to adjust the display panel between a first position, covering at least one portion of the roof, and a second position as a function of a position signal at least one of derived from a source and in accordance with a driving situation, the display panel configured to cover at least one portion of the windscreen in the second position.

2. A vehicle according to claim 1,
   further comprising a luminosity sensor,
   wherein the display panel has an additional layer with a substrate having an adjustable degree of light transmission, and
   wherein the control circuitry is adapted to adjust a degree of light transmission through the display panel as a function of a transparency signal from the luminosity sensor.

3. A vehicle according to claim 1, wherein the source includes user input by at least one of a gesture, voice input and a touch signal, resulting in the position signal derived by the electronic control unit.

4. A vehicle according to claim 1, wherein the source includes a light detection sensor configured to estimate an angle of incidence of a light beam of a predefined intensity on the vehicle roof resulting in the position signal derived by the electronic control unit.

5. A vehicle according to claim 1, wherein the source includes a camera configured to estimate the position of eyes of a user driving the vehicle, resulting in the position signal derived by the electronic control unit.

6. A vehicle according to claim 1, wherein the display panel is movable by the controllable supporting arrangement along a longitudinal direction of the vehicle.

7. A vehicle according to claim 1, wherein the driving situation of the vehicle is one of manual driving and autonomous driving.

8. A vehicle according to claim 7, wherein during the autonomous driving, the display panel is adjusted to the second position where the display panel is configured to provide a graphical user interface.

9. A vehicle according to claim 8, wherein the display panel is configured to provide an electronic mirror.

10. A vehicle, comprising:
a roof;
a windscreen;
a display panel with a matrix of pixel elements, the display panel being flexible;
a controllable supporting arrangement movably supporting the display panel;
an electronic control unit configured to adjust the display panel between a first position, covering at least one portion of the roof, and a second position as a function of a position signal at least one of derived from a source and in accordance with a driving situation, the display panel configured to cover at least one portion of the windscreen in the second position; and
control circuitry configured to display a representation of a roof module as at least one graphic display object on the display panel at a constant position relative to a reference point inside the vehicle, by shifting an actuation of the pixel elements of the graphic display object representing the roof module, where a magnitude of a rate of shifting the actuation of the pixel elements is equal to a magnitude of a rate of change of position of the display panel and a direction of the rate of shifting the actuation of the pixel elements is opposite to that of the rate of change of the position of the display panel.

11. A vehicle according to claim 10,
further comprising a luminosity sensor,
wherein the display panel has an additional layer with a substrate having an adjustable degree of light transmission, and
wherein the control circuitry is adapted to adjust a degree of light transmission through the display panel as a function of a transparency signal from the luminosity sensor.

12. A vehicle according to claim 11, wherein the source includes user input by at least one of a gesture, voice input and a touch signal, resulting in the position signal derived by the electronic control unit.

13. A vehicle according to claim 12, wherein the source includes a light detection sensor configured to estimate an angle of incidence of a light beam of a predefined intensity on the vehicle roof resulting in the position signal derived by the electronic control unit.

14. A vehicle according to claim 13, wherein the source includes a camera configured to estimate the position of eyes of a user driving the vehicle, resulting in the position signal derived by the electronic control unit.

15. A vehicle according to claim 14, wherein the display panel is movable by the controllable supporting arrangement along a longitudinal direction of the vehicle.

16. A vehicle according to claim 15, wherein the driving situation of the vehicle is one of manual driving and autonomous driving.

17. A vehicle according to claim 16, wherein during the autonomous driving, the display panel is adjusted to the second position where the display panel is configured to provide a graphical user interface.

18. A vehicle according to claim 17, wherein the display panel is configured to provide an electronic mirror.

* * * * *